US007356582B2

(12) United States Patent
Tajima (10) Patent No.: US 7,356,582 B2
(45) Date of Patent: Apr. 8, 2008

(54) ELECTRONIC APPARATUS AND COMMUNICATION DEVICE SWITCHING METHOD ACCORDING TO DEVICE PRIORITY

(75) Inventor: Takeshi Tajima, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 908 days.

(21) Appl. No.: 10/234,210

(22) Filed: Sep. 5, 2002

(65) Prior Publication Data

US 2003/0105860 A1 Jun. 5, 2003

(30) Foreign Application Priority Data

Nov. 30, 2001 (JP) .............................. 2001-367246

(51) Int. Cl.
*G06F 15/173* (2006.01)
(52) U.S. Cl. .................. 709/224; 709/217; 709/218; 709/219; 709/227; 709/228; 709/229; 709/239; 709/223; 709/240; 715/700
(58) Field of Classification Search ................ 709/220, 709/217–219, 223–229, 238–240; 726/16; 340/3.1, 5.65; 710/15, 18, 62; 715/700
See application file for complete search history.

(56) References Cited

U.S. PATENT DOCUMENTS

| 4,796,025 | A  | * | 1/1989 | Farley et al. ............... 340/3.51 |
| 5,935,217 | A  | * | 8/1999 | Sakai et al. .................. 709/249 |
| 6,223,218 | B1 | * | 4/2001 | Iijima et al. ................. 709/221 |
| 6,230,194 | B1 | * | 5/2001 | Frailong et al. ............. 709/220 |
| 6,295,556 | B1 | * | 9/2001 | Falcon et al. ................ 709/220 |
| 6,336,155 | B1 | * | 1/2002 | Ito et al. ........................ 710/37 |
| 6,700,674 | B1 | * | 3/2004 | Otsuka et al. ............. 358/1.15 |
| 6,779,004 | B1 | * | 8/2004 | Zintel .......................... 709/227 |
| 6,789,111 | B1 | * | 9/2004 | Brockway et al. .......... 709/222 |
| 6,865,687 | B1 | * | 3/2005 | Ichima ........................... 714/2 |
| 7,039,709 | B1 | * | 5/2006 | Beadle et al. ............... 709/227 |
| 7,047,088 | B2 | * | 5/2006 | Nakamura et al. ............ 700/19 |

(Continued)

FOREIGN PATENT DOCUMENTS

EP           A 0 998 094 A2        5/2000

(Continued)

OTHER PUBLICATIONS

Norimasa Nakamura et al., U.S. Appl. No. 10/101,757, "Information Device With Wireless Modules", filed Mar. 21, 2002.

(Continued)

*Primary Examiner*—David Wiley
*Assistant Examiner*—Alina Boutah
(74) *Attorney, Agent, or Firm*—Finnegan, Henderson, Farabow, Garrett & Dunner, L.L.P.

(57) ABSTRACT

An electronic apparatus allows communication devices to be connected thereto, and has a plug-and-play function of automatically setting a communication device to be connected. A communication monitoring module monitors the communication statuses of the communication devices connected to the electronic apparatus. A registry stores information indicative of the priorities in use of the communication devices connected to the electronic apparatus. A switching module uses a plug-and-play function to switches the communication devices such that one communication device is used exclusively, on the basis of the communication statuses of the communication devices obtained from the communication monitoring module and the information stored in the registry.

12 Claims, 7 Drawing Sheets

U.S. PATENT DOCUMENTS

| | | | |
|---|---|---|---|
| 2002/0036793 A1* | 3/2002 | Roosen et al. | 358/1.15 |
| 2003/0005100 A1* | 1/2003 | Barnard et al. | 709/223 |
| 2003/0033389 A1* | 2/2003 | Simpson | 709/220 |
| 2003/0079030 A1* | 4/2003 | Cocotis et al. | 709/229 |
| 2004/0133687 A1* | 7/2004 | Yamaguchi et al. | 709/228 |
| 2004/0218201 A1* | 11/2004 | Lermant et al. | 358/1.13 |
| 2006/0294251 A1* | 12/2006 | Cocotis et al. | 709/229 |
| 2007/0185979 A1* | 8/2007 | Yoshida | 709/220 |

FOREIGN PATENT DOCUMENTS

| | | |
|---|---|---|
| JP | 5-316248 | 11/1996 |
| JP | 9-284420 | 10/1997 |
| JP | 2000-322158 | 11/2000 |
| JP | 2001-119436 | 4/2001 |
| WO | WO 00/19679 A | 4/2000 |

OTHER PUBLICATIONS

Norimasa Nakamura et al., U.S. Appl. No. 09/987,615, "Switch Control System and Switch Control Method for Communication Apparatus", filed Nov. 15, 2001.

Communication of Jun. 14, 2005, from the European Patent Office (4 pages).

* cited by examiner

ELECTRONIC APPARATUS AND COMMUNICATION DEVICE SWITCHING METHOD ACCORDING TO DEVICE PRIORITY

CROSS-REFERENCE TO RELATED APPLICATIONS

This application is based upon and claims the benefit of priority from the prior Japanese Patent Application No. 2001-367246, filed Nov. 30, 2001, the entire contents of which are incorporated herein by reference.

BACKGROUND OF THE INVENTION

1. Field of the Invention

The present invention relates to an electronic apparatus to which a plurality of communication devices are connectable, and a communication device switching method.

2. Description of the Related Art

In recent years, an electronic apparatus such as a personal computer (PC) has been commonly used to communicate with an external apparatus via a network.

An electronic apparatus such as a PC can be provided with various communication devices (devices corresponding to various communication functions such as a dial up adapter, a cellular telephone, and a radio network) in order to carry out various communications depending on applications.

These communication functions are provided as devices built in the electronic apparatus or externally installed thereon, and are statically or dynamically managed under the control of an operating system (OS) running on the electronic apparatus.

When the electronic apparatus such as a PC is provided with a plurality of communication devices, a user must perform switching operations to enable or disable each of the communication devices in order to accomplish desired communications. However, it is not easy for the user to switch the communication devices.

The functions and configuration of recent electronic apparatus are very complicated. It is thus virtually impossible to simply switch connections using hardware. Further, if software is used for such switching operations, the user is forced to perform very complicated operations. In particular, dynamic switching operations require very high skills.

BRIEF SUMMARY OF THE INVENTION

Embodiments of the present invention provide an electronic apparatus that can switch a plurality of communication devices, and a communication device switching method.

According to one aspect of the invention, there is provided an electronic apparatus comprising a communication monitoring unit configured to monitor communication status of a communication device connected to the electronic apparatus; a storage unit configured to store information indicative of priorities in use of a plurality of communication devices; and a switch control unit configured to switch to one of the plurality of communication devices, on the basis of the communication statuses of the communication devices obtained from the communication monitoring unit and the information stored in the storage unit.

According to another aspect of the invention, there is provided a communication device switching method applied to an electronic apparatus, the method comprising storing, in a storage area, information indicative of priorities in use of a plurality of communication devices; monitoring the communication status of a communication device connected to the electronic apparatus; and switching to one of the plurality of communication devices, on the basis of the communication statuses of the communication devices and the information stored in the storage area.

Additional features and advantages of the invention will be set forth in the description which follows, and in part will be obvious from the description, or may be learned by practice of the invention. The features and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described below with reference to the drawings.

Figure 1:
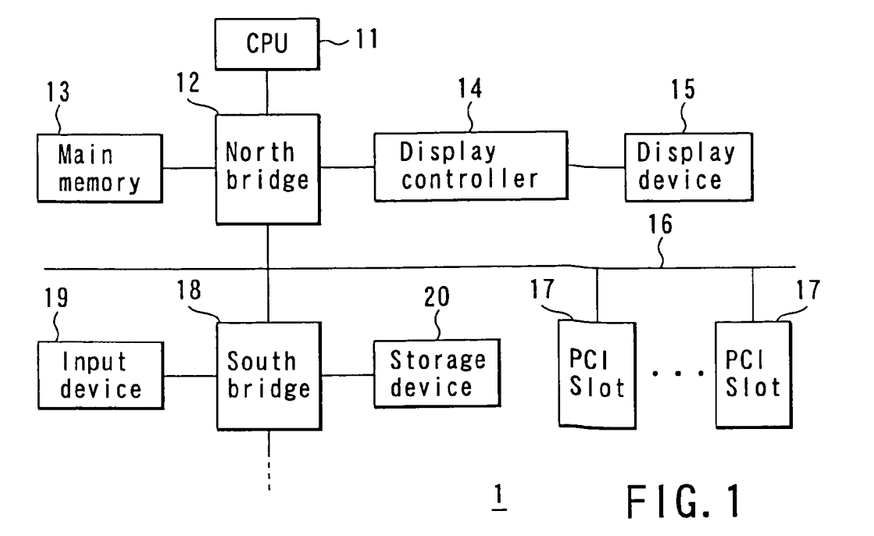
FIG. 1 is a block diagram showing the internal configuration of an electronic apparatus according to an embodiment of the present invention.

FIG. 1 is a block diagram showing the internal configuration of an electronic apparatus according to an embodiment of the present invention.

A communication device 1 is, for example, a personal computer (PC) including a central processing unit (CPU) 11, a north bridge 12, a main memory 13, a display controller 14, a display device 15, a peripheral component interconnect (PCI) bus 16, a plurality of PCI slots 17, a south bridge 18, an input device 19, a storage device 20, and the like.

The CPU 11 is a processor for controlling overall the operation of the entire communication device 1. For example, the CPU 11 controls displaying a dialog box or the like on a screen of the display device 15 to set data on switching of a plurality of communication devices and saving the data set in the dialog box through an input operation performed using the input device 19 in a predetermined storage area. Further, the CPU 11 executes a software program managed by an operating system (OS) running in the main memory 13 to automatically and properly switch the plurality of communication devices (network devices) installed in the plurality of PCI slots 17.

The north bridge 12 includes a host-PCI bridge to allow the CPU 11 and the PCI bus to communicate with each other, a memory controller to control the main memory 13, and an accelerated graphics port (AGP) controller for controlling the display controller 14 corresponding to an AGP-compatible video card.

The main memory 13 is used as a work area for the CPU 11 and stores the OS 21 and various software programs and data (including programs for switching control of the communication devices and setting information) managed by the OS.

The display controller 14 complies with the AGP and controls displaying data sent by the north bridge 12 on the display device 15.

The display device 15 displays display data on the screen in accordance with signals sent from the display controller 14.

The PCI bus 16 is located between the north bridge 12 and the south bridge 18, and has PCI slots 17 connected thereto.

The plurality of PCI slots 17 are expanded slots (connectors) connected to the PCI bus 16. PCI-compatible communication devices (implemented, for example, in card form) can be externally installed in these slots.

The south bridge 18 includes a PSI-ISA bridge to allow the PCI bus 16 and an industrial standard architecture (ISA) bus (not shown) to communicate with each other, a USB controller to control universal serial bus (USB)-compatible devices, an integrated device electronics (IDE) controller to control various disk drives, and the like.

The input device 19 corresponds to a mouse or a keyboard that allows a user to perform input operations, and is implemented as, for example, a USB-compatible device.

The storage device 20 corresponds to a hard disk drive or a CD-ROM drive to store programs and data, and is implemented as an IDE-compatible device.

In this embodiment, it is assumed that four communication devices are mounted in the PCI slots 17 in the electronic apparatus 1. These four communication devices are called devices A to D.

Figure 2:
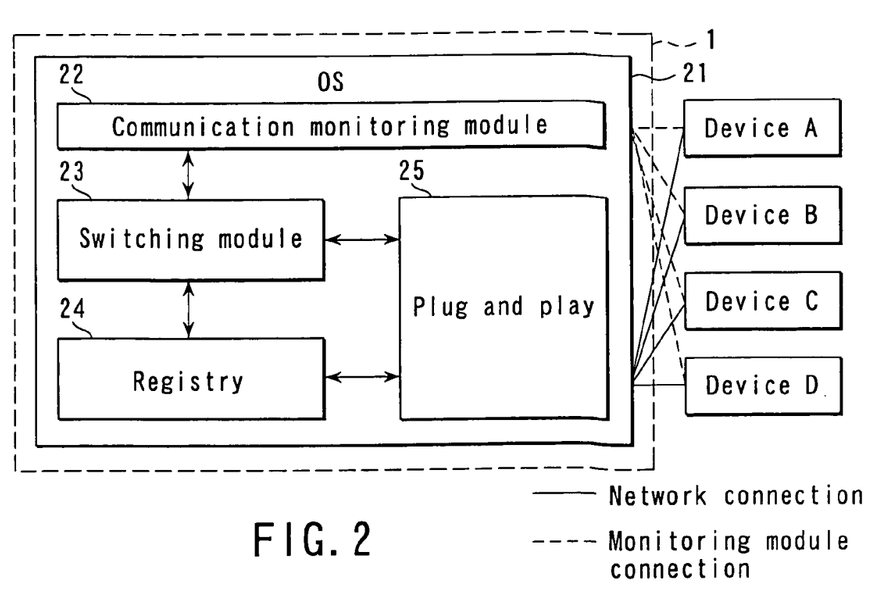
FIG. 2 is a block diagram showing the relationship between a group of programs managed by an OS running in a main memory in the electronic apparatus and a plurality of communication devices.

FIG. 2 is a block diagram showing the relationship between a group of programs managed by the OS running in the main memory 13 in the electronic apparatus and the plurality of communication devices (devices A to D).

The OS 21 includes various functions including a communication monitoring module 22, a switching module 23, a registry 24, and a plug-and-play (PnP) function 25, and dynamically manages these functions.

The communication monitoring module 22 always monitors the communication statuses of devices A to D mounted in the electronic apparatus 1 to provide the switching module 23 with information indicative of these communication statuses and to store this information in the registry 24.

The switching module 23 references the communication statuses of devices A to D obtained from the registry 24 (or the communication monitoring module 22, OS 21, or various device drivers) as well as a link table (described later) stored in the registry 24 to determine one of devices A to D which is appropriate to be used (enabled) and to instruct the PnP function 25 to switch to the determined device.

The registry 24 stores a link table in which the priorities of the various communication devices, which are to be switched, are set. The link table is provided with information indicating which device is being used.

The PnP function 25 is supported, for example, by the OS 21, and automatically sets data required to add or delete hardware (in this case, devices A to D). In this embodiment, the PnP function 25 can control at least connections to PCI-compatible devices. Further, if the PnP function 25 has switched devices A to D, it causes the registry 24 to store information indicative of the device currently being used, directly or via the switching module 23. The switching control according to this embodiment is carried out using the PnP function 25.

(Procedure of Establishing Basic State)

When the electronic apparatus 1 is activated, the switching module 23 first deactivates all devices using a standard function of the PnP function 25. In this case, a function of the OS 21 deactivates all devices and some of the functions (TCP/IP and the like) provided by the devices.

Figure 3:
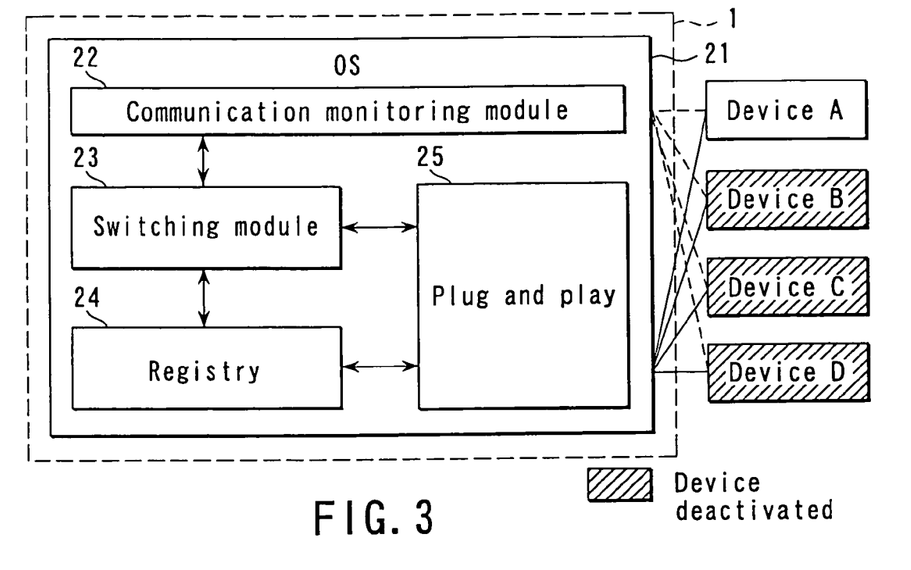
FIG. 3 is a diagram showing a state (basic state) in which one of a plurality of communication devices is selected as one to be used exclusively.

Subsequently, only the device to be used exclusively is activated using the standard function of the PnP function 25. In this case, the function of the OS 21 activates the device to be used and the functions provided by this device. Further, the communication function on the electronic apparatus 1 is automatically set by the functions of the OS 21 and PnP function 25 so that communication can be carried out using a selected communication device. FIG. 3 shows a state (basic state) in which one of the plurality of devices A to D, which is to be used exclusively (for example, device A), is selected and used. The shaded parts in the figure show that the corresponding devices are deactivated.

The procedures for establishing the basic state are summarized as follows:
  Devices A to D are deactivated using the PnP function 25
  One (for example, the device A) of the devices which is to be used exclusively is activated (Manual Switching)

Figure 4:
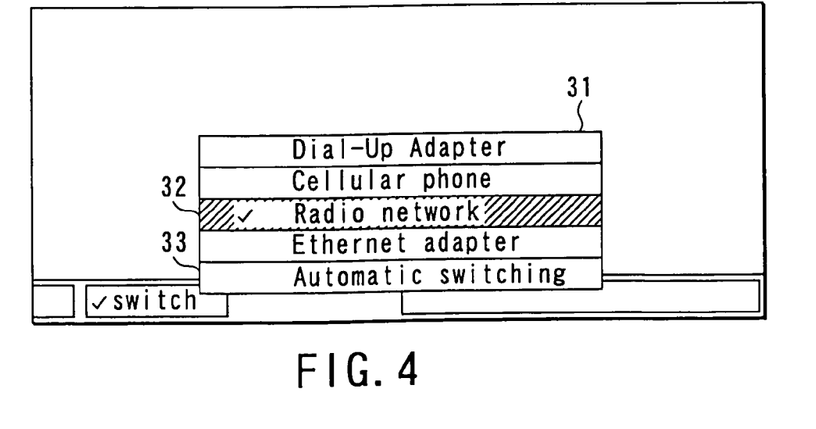
FIG. 4 is a diagram showing a screen on which data on switching of the communication devices is set.

The device to be used can be switched using a GUI such as the one shown in FIG. 4.

That is, the user operates the input device 19 to display a pull-down menu 31 on the screen of the display device 15. The pull-down menu 31 shows items indicative of devices A to D (corresponding to various communication functions such as a dial-up adapter, a cellular phone, a radio network, and an Ethernet™ adapter). The pull-down menu 31 allows a check mark 32 to be set against only one device item so that one device is exclusively selected (i.e., two or more devices cannot be selected simultaneously). Once the user has selected a device by setting a check mark 32 against it, the menu is closed and the current device is switched to the selected device.

The device is manually switched using the following procedures:
  It is assumed that the device to be used is switched from device A in the basic state to device B.

Figure 5:
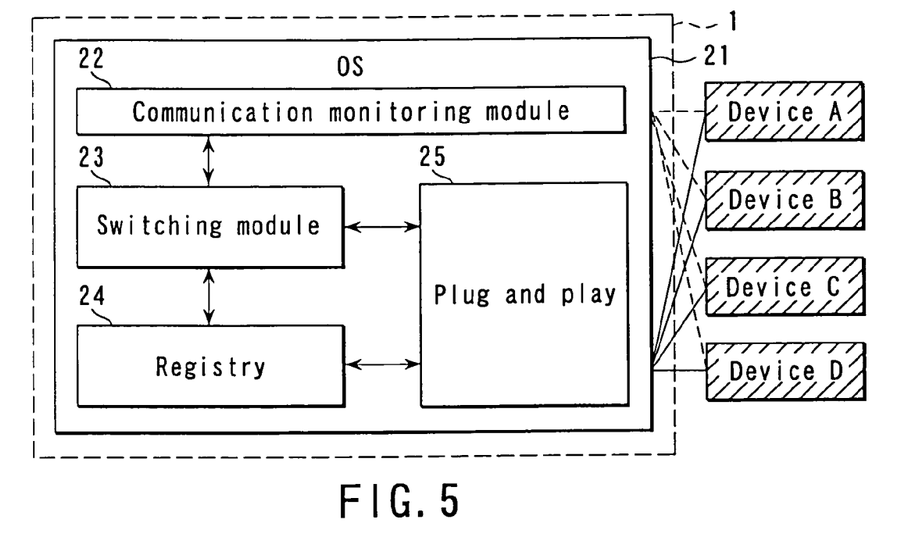
FIG. 5 is a diagram showing that the operations of all communication devices are deactivated before switching.

First, as shown in FIG. 5, the currently operating device A is deactivated by the PnP function 25. In this case, the function provided by device A is partially deactivated. This deactivation is carried out by the OS 21.

Figure 6:
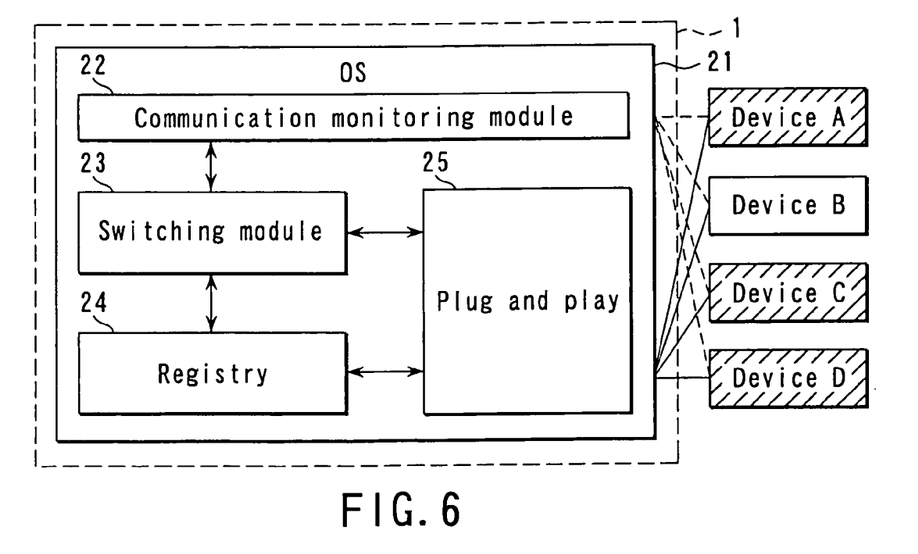
FIG. 6 is a diagram showing that one communication device is activated after a switching operation has been performed.

After device A has been deactivated, the device to be used, device B, is activated using the PnP function 25. In this case, device B and the functions provided by this device are activated by the function of the OS 21. Further, the communication function on the electronic apparatus 1 is automatically set by the functions of the OS 21 and PnP function 25 so that communication can be carried out using a selected communication device. The statuses of the devices after switching are retained in the registry 24. FIG. 6 shows that the device B is activated after switching.

The procedures for manual switching are summarized as follows:

The currently operating device is deactivated (in this state, all devices are deactivated)

One of the devices which is to be used is activated

In this regard, while the switching operation is being performed (i.e. the state shown in FIG. 5), the communication function is halted. Accordingly, input operations from the user must be locked to prevent instructions from being given to the OS 21. Further, in this case, it is desirable that indication that the switching operation is being performed be provided on the screen of the display device 15 or that another appropriate process be executed so that the user will not feel disconcerted by the switching and the locking of inputs.

(Automatic Switching)

Whether or not the device is automatically switched can be determined using the GUI shown in FIG. 4. That is, a setting item is provided which is required to determine whether a switching operation is to be manually or automatically performed. In this case, the automatic switching status is set by setting a check mark against the "Automatic setting" item.

Figure 7:
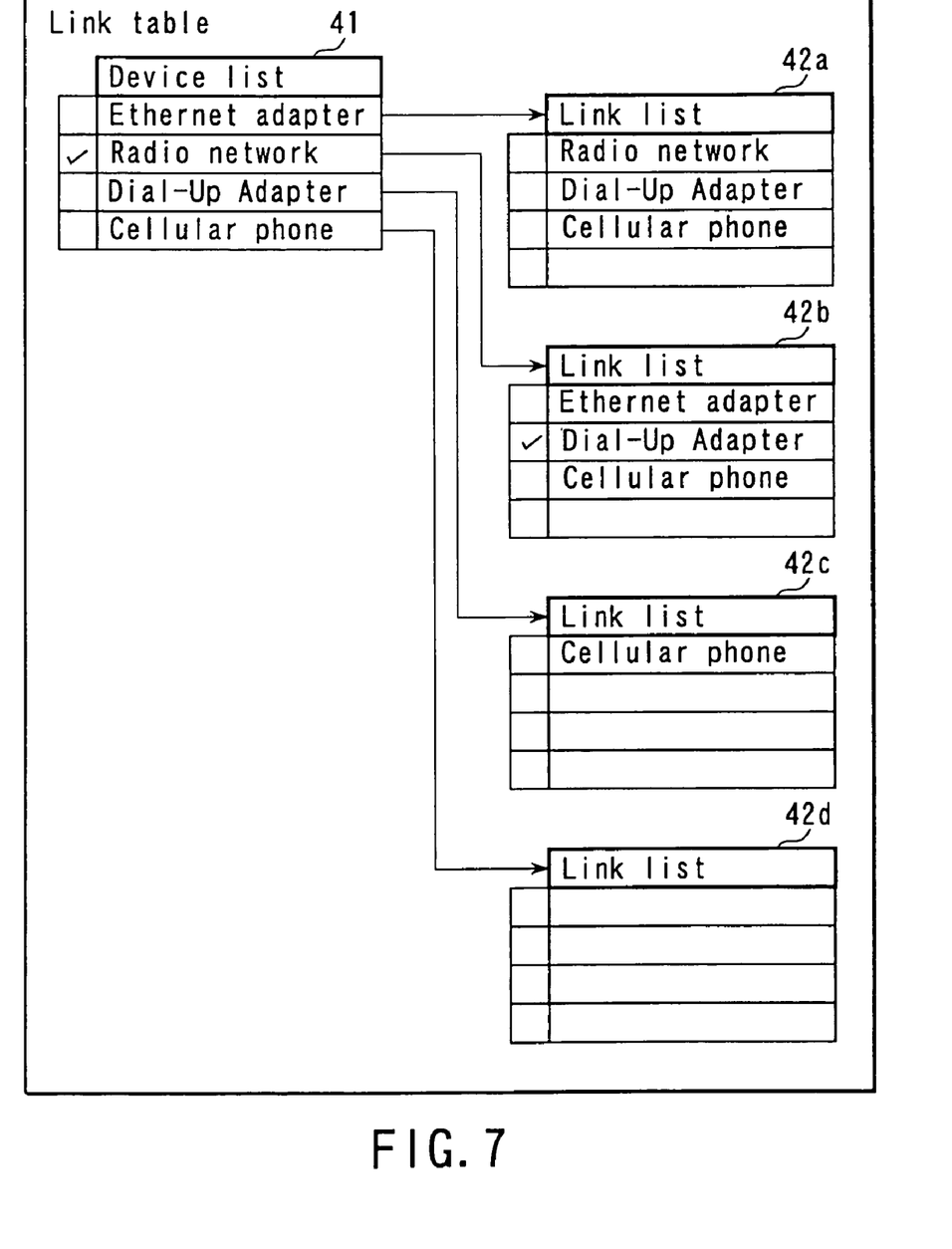
FIG. 7 is a diagram showing a link table retained in a registry.

In this embodiment, a link table (a switching list) is retained in the registry 24 as information indicative of the priorities in use of the communication devices in order to enable automatic switching of the devices. The link table has a device list 41 indicative of the devices connected to the electronic apparatus 1 and link lists 42*a* to 42*d* each indicative of the next candidate device to be used if the corresponding one of the devices listed in the device list 41 is disabled from communication, as shown in FIG. 7. The contents of the link table can be set by a user via the GUI. The set contents are saved (registered) in the registry 24.

Each of the devices shown in the device list 41 is associated with one of the link lists on a one-to-one correspondence. In the device list 41, the items indicative of the devices are arranged in order of decreasing priority. For example, if the Ethernet adapter has the highest use priority, the radio network and the dial-up adapter have the second and third use priorities, respectively, and the cellular phone has the lowest use priority, then the Ethernet adapter, radio network, dial-up adapter, and cellular phone are arranged in this order from top to bottom in the device list 41. If no devices are connected to the electronic apparatus 1, the device list 41 is empty.

Similarly, in the link lists 42*a* to 42*d*, the items indicative of the devices are arranged in order of decreasing use priority. For example, assuming that communication via the Ethernet adapter is interrupted and the user desires to connect to the radio network, then if the radio network is unavailable, second priority is given to the dial-up adapter and third priority to the cellular phone. Thus, the radio network, the dial-up adapter, and the cellular phone are arranged in this order in the link list 42*a*. If only one device is connected to the electronic apparatus or the connections are set to remain unchanged, the list may be empty. Further, a device associated with a certain link list is inhibited from being registered in the list. For example, a setting for switching to the Ethernet adapter when communication via the Ethernet adapter is interrupted is prohibited.

Further, the link table includes a space to the left of each item indicative of one device so that a check mark can be set in this space. In the example shown in FIG. 7, after communication with the radio network has been interrupted, the first candidate in the link list 42*b*, the Ethernet adapter becomes unavailable, and the second candidate, the dial-up adapter is now in operation.

Figure 8:
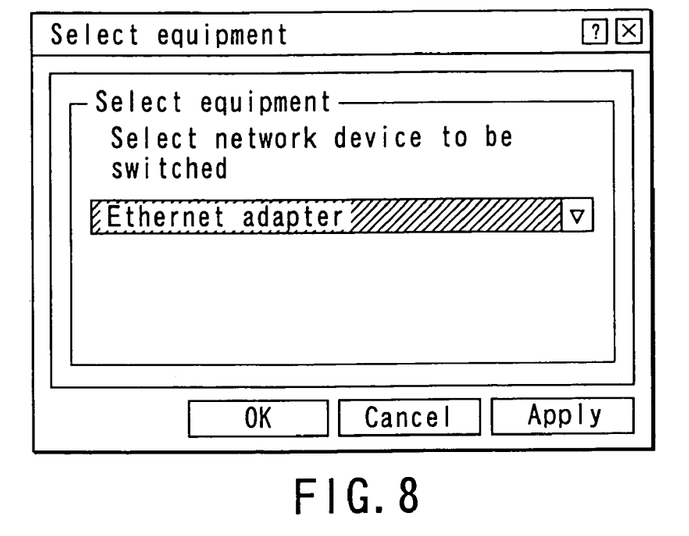
FIG. 8 is a diagram showing a screen on which a communication device to be switched is selected.
Figure 9:
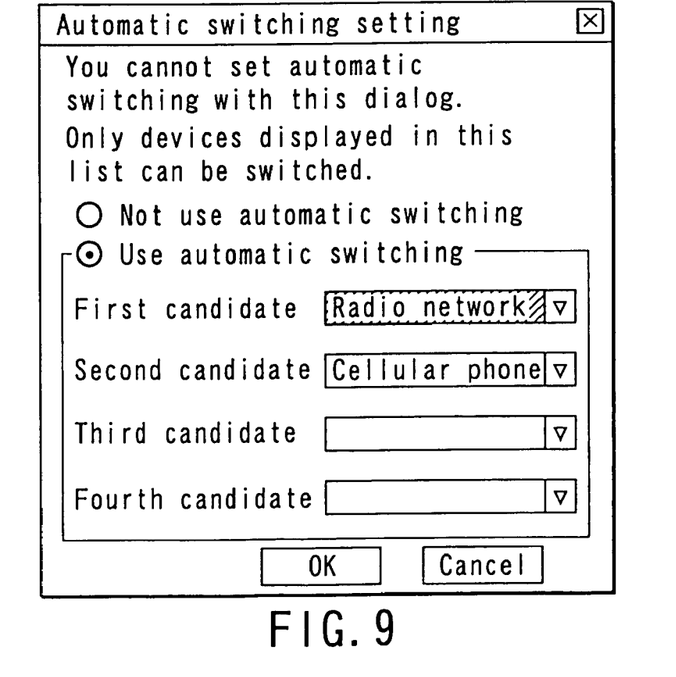
FIG. 9 is a diagram showing a screen on which communication device candidates for automatic switching are set.

The contents of the device list 41 and link lists 42*a* to 42*d* in the link table can be set through the GUI shown in FIGS. 8 and 9. In this case, a pull-down menu in each dialog box can be used to determine the devices to be switched and the priorities in use of the devices.

In the dialog box in FIG. 8, it is possible to select a device (as in the device list) to be switched. When, in this dialog box, a device is specified and the OK button is clicked, the dialog box in FIG. 9 is displayed. In the dialog box in FIG. 9, it is possible to specify devices (as in the link list) to be switched as the first to fourth candidates by setting a check mark against the item "Use automatic switching". The set contents shown in FIGS. 8 and 9 are reflected in the device list 41 and the link lists 42*a* to 42*d*.

The above use of the GUI enables the desired order of automatic switching to be set by a simple operation.

The procedures for automatic switching is summarized as follows:

Basic state

The status of the currently operating device is obtained, and the contents of the link table are updated The device to be used is determined on the basis of the contents of the link table The device is switched, and the link table is updated according to the switching Now, operation according to this embodiment will be described with reference to the flowcharts in FIGS. 10 and 11.

Figure 10:
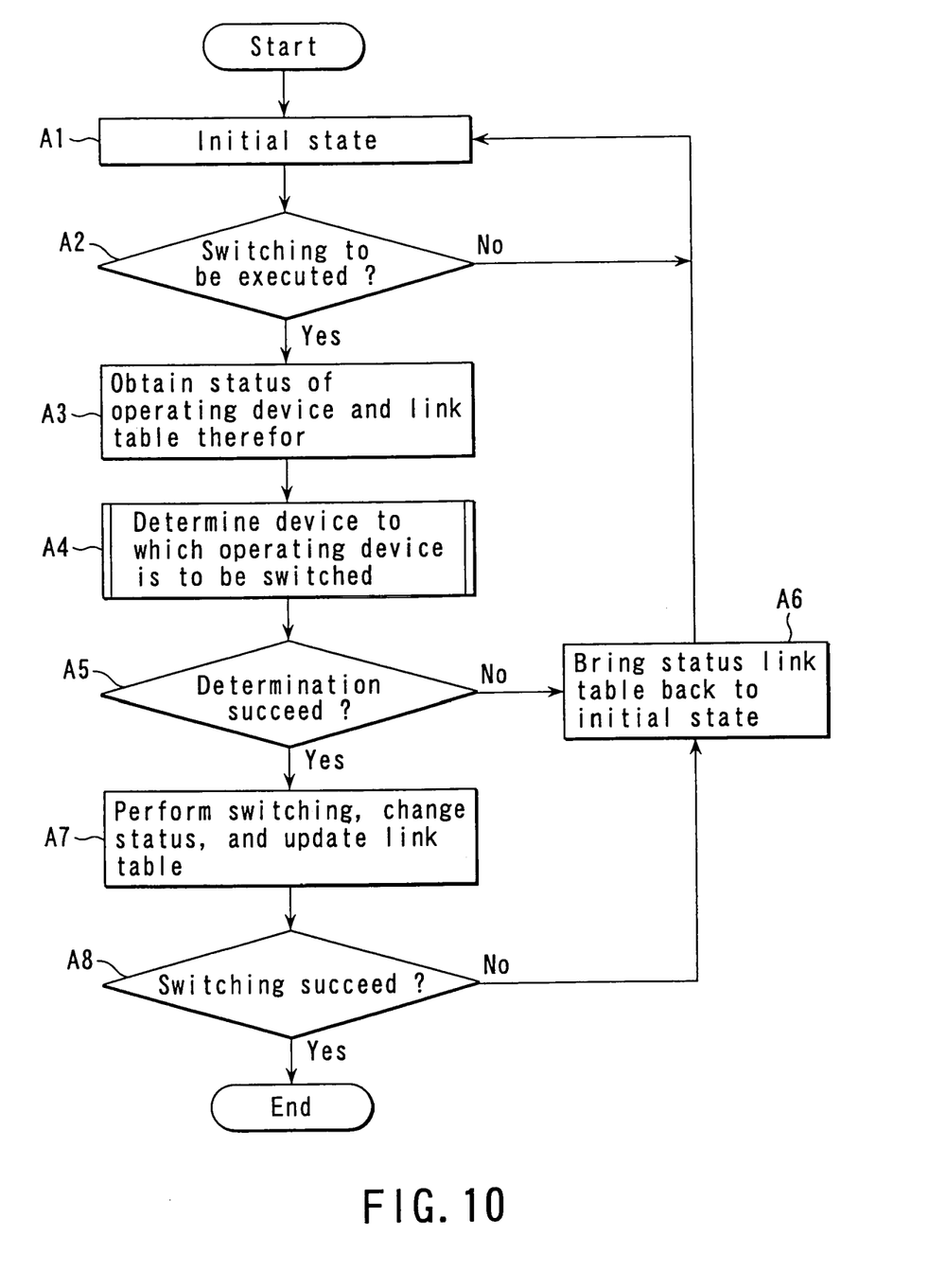
FIG. 10 is a flowchart useful in describing an operation according to the above embodiment.
Figure 11:
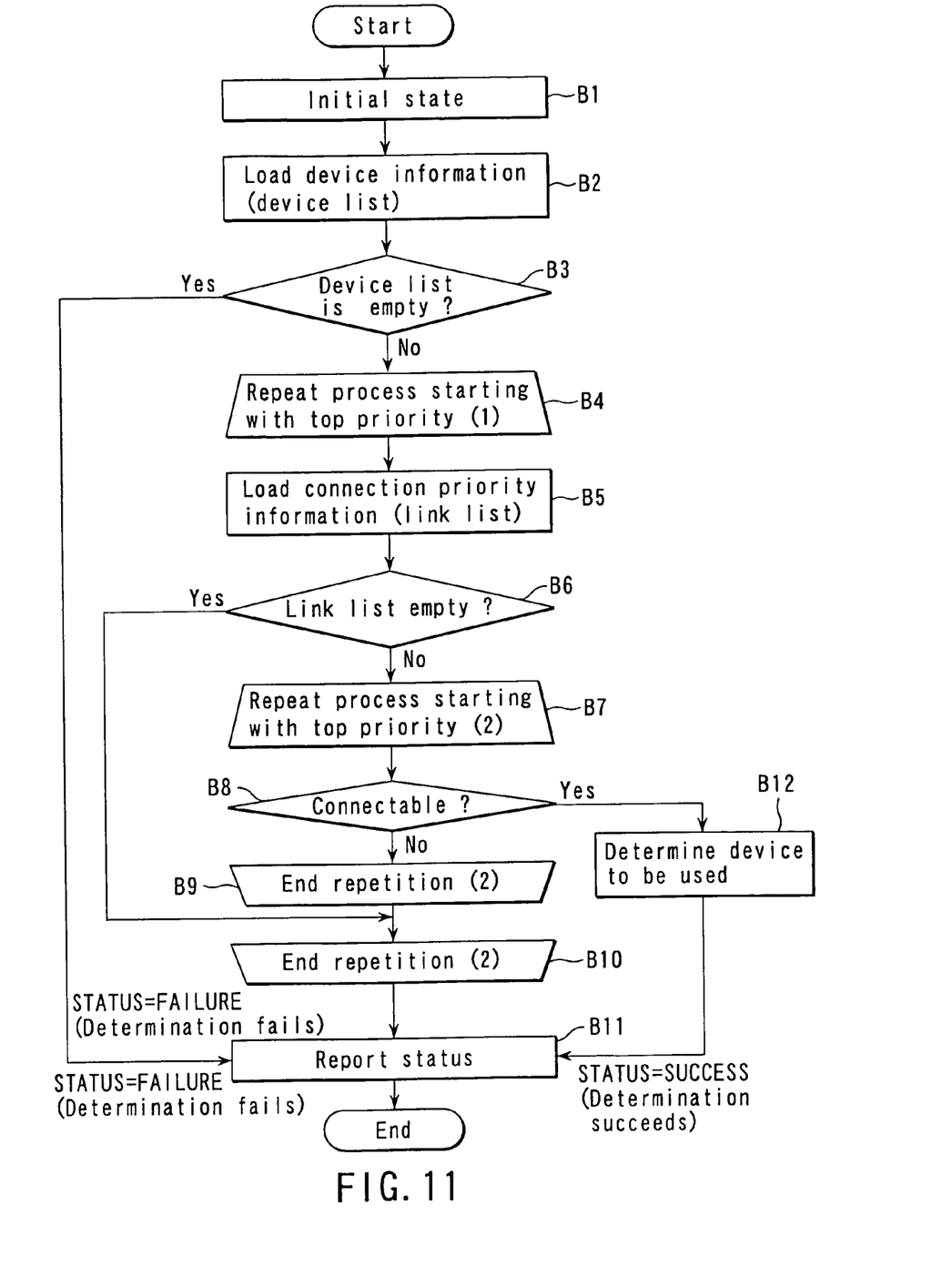
FIG. 11 is a flowchart useful in describing step A4 in FIG. 10 in detail.

In FIG. 10, the electronic apparatus 1 is in its initial state (basic state) in which only one device (e.g., device A) is in operation (step A1).

If the device is not to be switched (NO in step A2), the electronic apparatus 1 remains in its initial state. However, if the device must be switched for any reason (e.g., a link lost message (disconnection) issued by the OS 21 is detected or the PC is switched from AC power to battery power) (YES in step A2), then the switching module 23 obtains the status information and link table for the operating device from the registry 24 and the like (step A3). Then, on the basis of the status information and the contents of the link table, the switching module 23 determines a device to be used through switching (step A4).

If the device to be used cannot be determined for any reason (NO in step A5), the switching module 23 sets the status information and link table in the registry 24 to their initial states (basic states) (step A6). The process then returns to step A1.

On the other hand, if the device to be used can be determined (YES in step A5), the current device is switched to the determined device through the PnP function 25. Further, the status information and the contents of the link table in the registry 24 are updated (step A7).

If the device has not been successfully switched (NO in step A8), the switching module 23 sets the status information and link table in the registry 24 to their initial states (basic states) (step A6). The process then returns to step A1.

On the other hand, if the device has been successfully switched (YES in step A8), the switching process is completed.

Now, the processing executed in step A4 (determination of the device to be used through switching) will be described in detail with reference to FIG. 11.

In the initial state (basic state), the device list 41 having device information in the link table is loaded (steps B1 and B2).

In this case, if the device list 41 is empty (YES in step B3), the system is notified that the device to be used cannot be determined (step B11). On the other hand, if the device list 41 is not empty (NO in step B3), a first repeated process (steps B4 to B9) for sequentially selecting the device to be used is executed, starting with a device with top priority.

In this first repeated process, the link list (corresponding to a certain device in the device list 41) having information indicative of the priorities of devices is loaded (step B5).

In this case, if the link list is empty (YES in step B6), the first repeated process is ended (step B10), and the system is notified that the device to be used cannot be determined (step B11). On the other hand, if the device list 41 is not empty (NO in step B6), a second repeated process (steps B7 to B9) for sequentially selecting the device to be used is executed, starting with a device with top priority.

In the second repeated process, it is determined whether or not the device to be selected is connectable, with reference to the link list and status information (step B8).

If the device is not connectable (NO in step B8), the second repeated process is ended (step B9). On the other hand, if the device is connectable (YES in step B8), this connectable device is selected as the device to be used (step B12). Then, the system is notified that the device to be used has been determined (step B11).

As described above, according to this embodiment, it is possible to automatically and efficiently switch a plurality of communication devices by employing a simple interface and the standard functions provided by the OS.

Further, the user can exclusively use one of the communication devices without having to make hard-to-understand and complicated settings for the communication devices. This makes it easier to switch the communication devices, thereby allowing the electronic apparatus to be operated more easily.

The present invention is not limited to the above-described embodiment, and various variations may be made thereto without deviating from the spirit thereof.

For example, in this embodiment, the switching control of PCI-compatible communication devices has been described. However, the electronic apparatus may be configured so as to have a plurality of USB- or IEEE 1394-compatible communication devices installed thereon so that the communication devices can be switched through a USB- or IEEE 1394-compatible plug-and-play function.

Further, instead of a personal computer, the electronic apparatus may be a PDA or the like.

As described above, according to the present invention, it is possible to automatically and properly switch a plurality of communication devices.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
   a communication monitoring unit configured to monitor communication status of a communication device connected to the electronic apparatus;
   a storage unit configured to store a link table that includes a device list indicative of communication devices connected to the electronic apparatus, the link table further including link lists each indicative of a next candidate communication device to be used when a corresponding one of the communication devices listed in the device list is disabled from communication, each of the link lists further including items indicative of one or more candidate communication devices and their priorities;
   a user interface configured to allow a user to set contents of each of the link lists stored in the storage unit by providing a screen that allows the user to specify one or more candidate communication devices and their priorities in automatic switching and, for each of the communication devices listed in the device list, enabling one of the candidate communication devices in accordance with their priorities when a corresponding one of the communication devices listed in the device list is disabled from communication; and
   a switch control unit configured to switch to one of the plurality of communication devices, on the basis of the communication statuses of the communication devices obtained from the communication monitoring unit and the information stored in the storage unit.

2. The electronic apparatus according to claim 1, wherein the switch control unit selects a communication device to be used subsequent to a communication device being used and switches the communication device being used to the selected communication device such that one communication device is used exclusively.

3. The electronic apparatus according to claim 1 or 2, wherein the switch control unit executes the switching such that at least two communication devices of the plurality of communication devices connected to the electronic apparatus are not simultaneously activated.

4. The electronic apparatus according to claim 1 or 2, further comprising a specifying unit configured to specify on a display screen one communication device to be used from among the plurality of communication devices connected to the electronic apparatus.

5. The electronic apparatus according to claim 1 or 2, further comprising a specifying unit configured to specify on a display screen the priorities in use of the plurality of communication devices connected to the electronic apparatus.

6. The electronic apparatus according to claim 1 or 2, wherein the switch control unit includes a switching module which switches the plurality of communication devices using a plug-and-play function.

7. A communication device switching method applied to an electronic apparatus, the method comprising:
   storing, in a storage area, a link table that includes a device list indicative of communication devices connected to the electronic apparatus, the link table further including link lists each indicative of a next candidate communication device to be used when a corresponding one of the communication devices listed in the device list is disabled from communication, each of the link lists further including items indicative of one or more candidate communication devices and their priorities;

allowing a user to set contents of each of the link lists stored in the storage area through a user interface by providing a screen that allows the user to specify one or more candidate communication devices and their priorities in automatic switching and, for each of the communication devices listed in the device list, further allowing the user to enable one of the candidate communication devices in accordance with their priorities when a corresponding one of the communication devices listed in the device list is disabled from communication;

monitoring the communication status of a communication device connected to the electronic apparatus; and switching to one of the plurality of communication devices, on the basis of the communication statuses of the communication devices and the information stored in the storage area.

8. The method according to claim 7, wherein the switching includes deactivating the plurality of communication devices and thereafter activating a communication device to be used, when the electronic apparatus is powered on.

9. The method according to claim 7, wherein the switching includes deactivating a communication device being used and thereafter activating a communication device to be used, when the communication device being used is to be switched to the communication device to be used.

10. The method according to claim 7, further comprising enabling a user to specify on a display screen one communication device to be used from among the plurality of communication devices connected to the electronic apparatus.

11. The method according to claim 7, further comprising enabling a user to specify on a display screen the priorities in use of the plurality of communication devices connected to the electronic apparatus.

12. The method according to claim 7, wherein the switching of the plurality of communication devices is executed using a plug-and-play function.

* * * * *